United States Patent [19]

Loomis et al.

[11] 4,439,076

[45] Mar. 27, 1984

[54] MOVABLE FREIGHT RESTRAINING DEVICE FOR FREIGHT CARS AND THE LIKE

[75] Inventors: Russell M. Loomis, Palos Heights; Michael D. Gaikowski, Homewood; Denis R. Brzezinski, Richton Park, all of Ill.

[73] Assignee: Unarco Industries, Inc., Chicago, Ill.

[21] Appl. No.: 249,898

[22] Filed: Apr. 1, 1981

[51] Int. Cl.³ .................. B60P 7/14; B61D 45/00
[52] U.S. Cl. ............................ 410/153; 49/409; 410/134
[58] Field of Search .............. 49/409; 244/118.1; 248/323, 340, 507, 508, 509; 410/121, 122, 126, 127, 129, 130, 131, 132, 133, 134, 138, 139, 142, 153

[56] References Cited

U.S. PATENT DOCUMENTS

| | | | |
|---|---|---|---|
| 3,168,055 | 2/1965 | Vander Hyde et al. | 410/134 |
| 3,208,403 | 9/1965 | Magarian et al. | 410/134 |
| 3,215,092 | 11/1965 | Knippel | 410/131 |
| 3,559,591 | 2/1971 | Breen et al. | 410/127 |
| 3,636,887 | 1/1972 | Konrad et al. | 410/134 |
| 4,208,970 | 6/1980 | Matyas | 410/153 |
| 4,325,204 | 4/1982 | Martine | 49/409 X |

Primary Examiner—Robert B. Reeves
Assistant Examiner—David F. Hubbuch
Attorney, Agent, or Firm—Clement and Ryan

[57] ABSTRACT

A movable device for restraining freight in a cargo area in a freight transporting vehicle, for use with a track extending along the cargo area at the top side portions of the vehicle. The device includes an upright stanchion having a vertically extending cargo restraining surface on one side normal to the track. A carriage rolls along the track to permit moving the restraining device to a desired position, and locking pins secure the stanchion in that position. A yoke connects the carriage with the stanchion, to provide a support framework for the stanchion that is rigid throughout its entire extent, in the vertical plane that passes through the center of gravity of the stanchion and is normal to the track, from the rollers of the carriage, along the roller axle and any supporting structure, along the yoke member, and across the stanchion to the vertical plane that passes through the center of gravity of the stanchion and is parallel to the track. It is preferred that the connection between the yoke and the upright stanchion be articulated in all horizontal directions, to permit a limited degree of swaying in response to displacement forces applied to the stanchion.

38 Claims, 9 Drawing Figures

MOVABLE FREIGHT RESTRAINING DEVICE FOR FREIGHT CARS AND THE LIKE

FIELD OF THE INVENTION

This invention relates to a movable device for restraining freight in a cargo area in a freight transporting vehicle, and in particular to such a device for use in a vehicle that has track means extending along at least a portion of the side wall of the cargo area, along which track the freight restraining device can be moved.

BACKGROUND OF THE INVENTION

In shipping various types of products in railroad freight cars on large pallets, in large containers, or the like, it has been necessary in effect to divide the car into temporary compartments in order to limit shifting of the lading and to reduce the load imposed on the ends of the car. For example, in a car loaded with relatively heavy mechanical parts, shifting of the entire load due to rapid stopping or starting of the car might impose a sufficient load on an end of the car to push it out or at least to bulge it substantially.

It has been the practice to ship various parts such as automobile parts, stampings and the like, as well as various subassemblies such as fenders, doors, and other body and frame parts, on pallets that extend the full width of a car and may be stacked vertically to fill substantially the full height of the car. Cars of this type are normally separated into three or more temporary compartments by bulkheads or lading separators that can be moved to different positions longitudinally of the car where they may be locked in place. These bulkheads engage the pallets and the materials thereon to limit shifting thereof in the car during transport.

Movable lading separators or freight bracing bulkheads for use in railroad freight cars in the manner just described have been known for many years. They have generally been supported by a carriage assembly of a type that extends across the car and is designed to travel along tracks in the upper portions of the freight car on both sides of the same, with the separators or bulkheads suspended from their two upper corners so they can be moved to different positions lengthwise of the car, where they separate the lading and hold it securely against displacement.

The movable bulkheads or separators most widely used in the prior art have extended completely across the width of the freight transporting vehicle. Some of these devices have provided bracing for the freight or lading that substantially completely encloses the space in which the freight or lading is located. Others of these devices, such as the device disclosed in U.S. Pat. No. 3,168,055 issued Feb. 2, 1965 to Vander Hyde et al., have had an open frame construction.

Some types of lading do not require lading separators or bracing devices that extend completely across the width of the transporting vehicle. Typical of such loads are large cartons containing automobile parts or subassemblies such as mentioned above, large appliances, or the like. In such cases, the necessary bracing can be accomplished merely by restraining the outer edge portions of the load, as for example by a pair of relatively narrow, elongated stanchions or columns that are suspended from tracks such as those used with the full width movable bulkheads, one of the stanchions being suspended from the track on each side of the vehicle. The cargo restraining surface of any such stanchion or column of course extends transversely for substantially less than one-half of the width of the cargo area in the transporting vehicle.

Movable freight restraining devices of the stanchion type just mentioned, such as the device disclosed in U.S. Pat. No. 4,208,970, have the advantage of substantially reducing the weight of the bracing device, while still providing a permanent installation in the transporting vehicle. However, when the suspended stanchion is at rest with its bottom end unrestrained, because of the construction of the carriage means from which the movable stanchion is supported in prior art devices such as that disclosed in the patent just referred to, the stanchion necessarily assumes a position quite far from the desired vertical position.

Such a prior art device has the disadvantage, when the stanchion is free of engagement with the usual locking device at the bottom thereof, that the user of the device must exert force against the stanchion to keep it from swinging out of the vertical into an extreme position in which it will provide an unwanted obstacle to the movement of cartons or other lading or may bump into, or otherwise impede the movement of, the user of the device or other occupant of the freight transporting vehicle. Such swinging of the stanchion far out of its usual vertical position frequently interferes with loading or unloading activities on the part of the user of the device, is always awkward and inconvenient for the user, may result in damage to the lading, and may even result in injury to the user.

Prior art devices that tend when unrestrained to swing quite a distance out of the vertical position must, for adequate operation, include means such as horizontally disposed rollers to oppose the sidewise thrust or angular movement of the supporting carriage means that necessarily accompanies any marked swinging of the stanchion and the resulting "cocking" of the carriage means. Any tendency of these prior art stanchions to swing out of the vertical places a very considerable stress on such means that are expected to oppose swinging. In doing this, they tend to cause damage to the very means that are designed to oppose any transverse or angular movement of the stanchion.

While for all the reasons given above it is highly advantageous to avoid the extreme tendency of known freight restraining devices of the stanchion type to swing far out of the vertical attitude when the bottom end of the stanchion is unrestrained, it is at the same time desirable to permit a limited amount of swinging of the stanchion with respect to its rolling carriage assembly. For if this movement is not permitted, when horizontal displacement forces of considerable magnitude are exerted on the lower portion of the stanchion during normal use of the device, potentially damaging stress will be unavoidably placed on the carriage assembly itself or on its connection with the stanchion. With the totally rigid connection means that is characteristic of known stanchion type freight bracing devices, no limited swinging such as just discussed is permitted.

Prior to the present invention, these troublesome disadvantages of the prior art devices have been accepted as being unavoidable. The freight restraining device of this invention insures that the stanchion normally assumes a definite vertical position, and in its preferred embodiment permits at the same time a limited amount of swinging of the stanchion in response to externally applied horizontal forces of sufficient magnitude—whether accidentally applied or forces such as the user himself may from time to time desire to apply—when the bottom end of the stanchion is momentarily not restrained.

SUMMARY OF THE INVENTION

The freight restraining device of this invention, which is adapted for use with track means extending along the cargo area at the top side portions of the vehicle, includes an upright stanchion having a vertically extending cargo restraining surface on one side normal to the track means. Horizontal axle means is positioned above the track means at right angles to the track so as to extend laterally beyond the track on at least one side. This axle means carries rotatably mounted roller means for rolling on the track, the roller means being disposed along the axle on both sides of the vertical plane that passes through the center of gravity of the stanchion and is parallel to the track means.

Yoke means supported by the axle at its upper end is connected with the stanchion at its lower end in such a way as to provide a support framework for the stanchion that is rigid throughout its entire extent, in the vertical plane that passes through the center of gravity of the stanchion and is normal to the track, from the roller means, along the axle and any supporting structure, along the yoke means, and across the stanchion to the vertical plane that passes through the stanchion center of gravity and is parallel to the track.

Improved results are achieved with the device of this invention if the connection between the yoke member and the upright stanchion is articulated in at least one direction. Best results are achieved if the connection is articulated in both a plane normal to the track means and a plane parallel thereto, and it is preferred that the connection be articulated in all horizontal directions.

Means may also be provided for preventing sliding movement of the roller means along the track and for preventing any substantial movement of the roller means transverse to the track means. The device is completed by locking means by which the stanchion may be locked in selected positions with respect to the cargo area.

This freight restraining device may have a single supporting roller positioned above the stanchion center of gravity, with a portion of the roller extending on each side of the vertical plane that passes through the center of gravity of the stanchion and is parallel to the track means. The device may also include a pair of rollers positioned above the stanchion center of gravity longitudinally along the track means, again with a portion of each roller on opposite sides of the vertical plane that passes through that center of gravity and is parallel to the track means. The device may also include rollers that are positioned on opposite sides of the vertical plane just described.

DETAILED DESCRIPTION OF PREFERRED EMBODIMENTS

Several preferred embodiments of the freight restraining device of this invention will now be described by reference to the accompanying drawings.

Overall Structure

Figure 1:
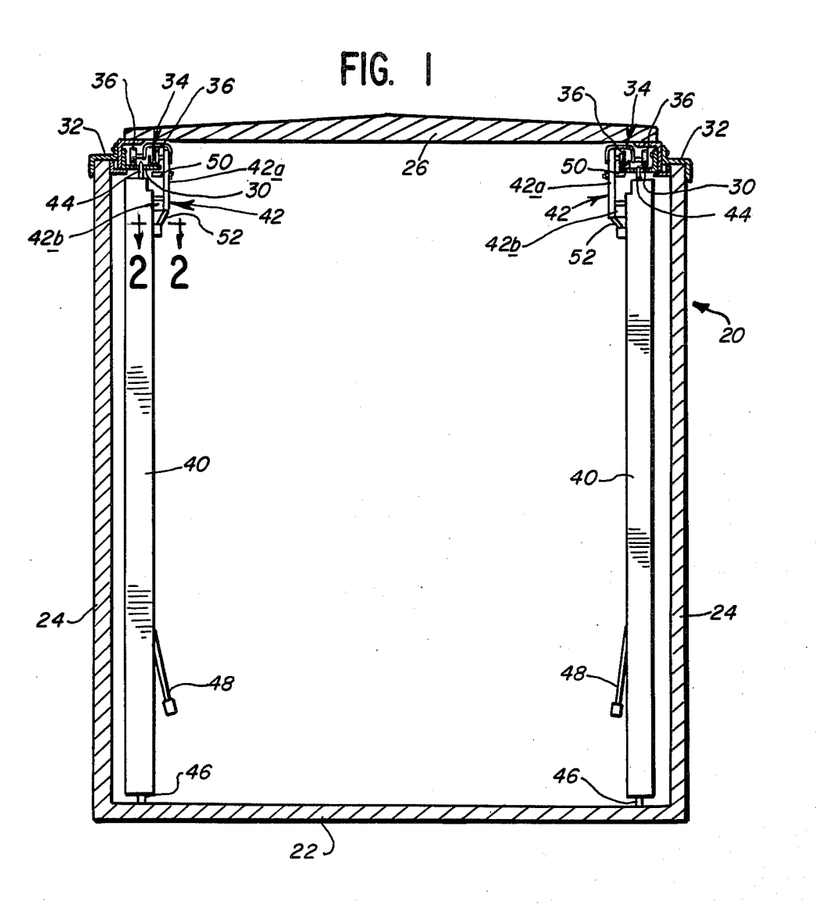
FIG. 1 is a transverse section through a railroad car embodying the invention, with the bottom, top, and side walls of the car shown diagrammatically.

FIG. 1 shows a portion of a freight transporting vehicle embodying the freight restraining device of this invention. Railroad box car 20 is shown as a particular example of one environment in which the device of this invention can be used, but this invention may be used in a freight transporting vehicle of any type that defines a cargo area adapted to receive goods to be shipped.

Bottom wall 22, side walls 24, and top wall 26 of the railraod box car, which in modern box cars are of steel construction, are for simplicity shown diagrammatically. The view shown is a sectional view along a plane transverse to the longitudinal axis of the box car near one end of the car.

Track means 30, whose longitudinal axes are substantially parallel to the longitudinal axis of the box car, are spaced inwardly of the respective side walls 24 of the car, and extend along at least a portion of the length of the cargo area in the top portion of that area. Each track means 30 is supported by a conventional arrangement of brackets 32 as commonly used with known movable bulkheads for restraining freight in freight transporting vehicles. Carriage means 34, including rollers 36, are adapted to roll on tracks 30, to be placed by the user of this device in the desired position within the box car.

An upright stanchion 40 is suspended from each carriage means 34, by means of yoke member 42 rigidly connected to the carriage means. Yoke 42 is a generally L-shaped member, including vertical arm 42a and horizontally disposed arm 42b, which extends toward exterior wall 24 of box car 20.

Locking means 44 at the top of stanchion 40 and locking means 46 at the bottom of the stanchion provide means for securing the stanchion in selected positions along track means 30 with respect to the cargo area. As will be explained in more detail below, locking means 44 and 46 are operated by actuation of handle 48.

Carriage hold-down devices 50 help to keep the two carriages 34 in position upon track means 30 by limiting upward movement of the carriages.

Figure 2:
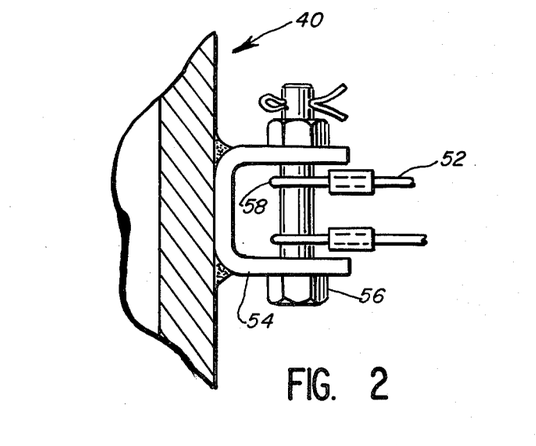
FIG. 2 is a sectional view of a portion of the structure shown in FIG. 1, taken along the line 2—2 in FIG. 1, showing the means for attaching a safety cable used with the device of this invention.

An additional safety feature is provided by safety cable 52, which connects yoke member 42 with stanchion 40, and will function to hold the stanchion in a generally upright position even if the connection between yoke 42 and the stanchion happens to become broken. FIG. 2 provides a sectional view, taken along line 2—2 in FIG. 1, showing a fragment of the side wall of stanchion 40 that faces towards the interior of the box car, with the means of attaching safety cable 52 to stanchion 40. Apertured bracket 54, attached by suitable means such as welding to stanchion 40, supports bolt 56, which is threaded through loops 58 at the free ends of safety cable 52.

A more detailed description of the carriage means, yoke member, and stanchion of the freight restraining device of this invention will be given below in connection with other Figures of the drawings.

The Stanchion

Figure 3:
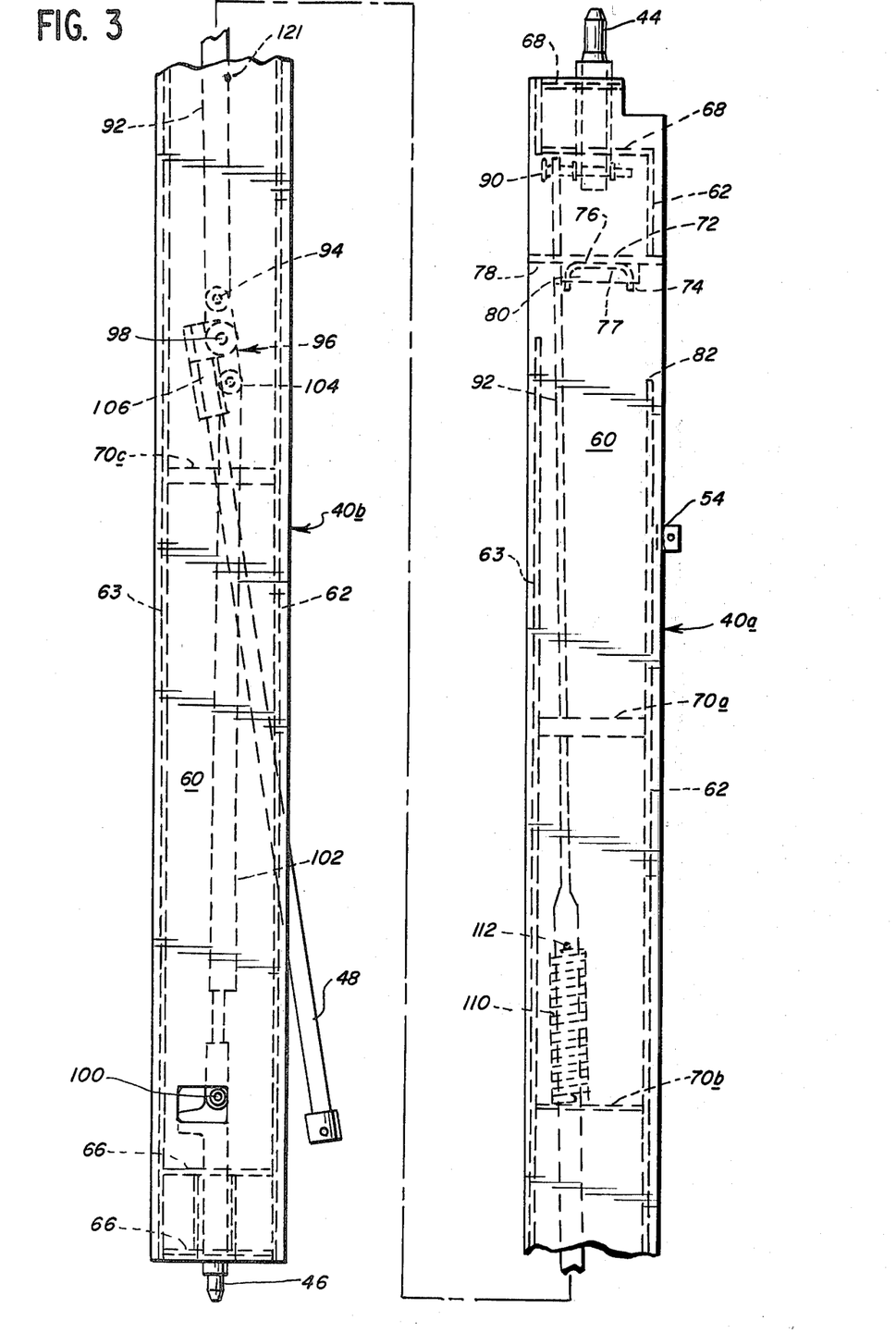
FIG. 3 is a front elevation of the stanchion portion of the device of this invention.

FIG. 3 is a front elevation view of upper portion 40a and lower portion 40b of stanchion 40. In general construction, stanchion 40 is an elongated boxlike structure comprised of front wall 60, rear wall 61 (on the far side of FIG. 3) and side walls 62 and 63. Various cross plates, including bottom plates 66, intermediate plates 70, and top plates 68, reinforce and provide structural integrity to stanchion 40.

Near the top of stanchion 40, horizontal, flat plate member 72 secured to the stanchion in its interior provides a means of supporting the stanchion on yoke member 42. Filler members 80 and 81 (FIGS. 3 and 8), one of which is secured to the interior of front and rear walls 60 and 61, respectively, of the stanchion, limit the possible movement of horizontal plate member 72 on its supporting structure. In the embodiment shown, channel member 74, which has a planar exterior surface 76, and a planar interior surface 77, on its bottom wall, is secured in an inverted position to bottom surface 78 of horizontal plate member 72.

When the freight restraining device of this invention is assembled, horizontal arm 42b of yoke member 42 is inserted through opening 82 in side wall 62 of stanchion 40, and its free end is brought into position under inverted channel member 74, to support the stanchion in a manner to be explained in more detail below.

Stanchion Locking Means

FIG. 1 shows schematically a locking arrangement by means of which stanchion 40 can be locked in preselected bracing positions along the cargo area of the freight transporting vehicle. The details of this arrangement of parts are shown in FIG. 3.

As seen in the latter Figure, upper locking pin 44 is slidably supported by apertured supporting plates 68, and lower locking pin 46 is slidably supported by apertured supporting plates 66, all of which plates are secured to the interior of stanchion 40. If desired, upper locking pin 44 may have a pair of projections adapted to extend into adjacent apertures formed in track means 30, so as to lock the upper end of stanchion 40 with respect to the track. Similarly, lower locking pin 46 may have a pair of projections adapted to extend into adjacent apertures of a lower locking strip (not shown) that extends along the floor of the railroad box car directly beneath the respective track means upon which stanchion 40 can be rolled.

Upper locking pin 44 (shown on the right-hand side of FIG. 3) is pivotally connected by means of pivot pin 90 to link 92, which passes through flat plate member 72 and apertured support plates 70a and 70b secured to the upper and intermediate portions, respectively, of the interior of the stanchion. The lower end of link 92 is pivotally connected at 94 to one arm of crank 96, which in turn is pivotally connected at 98 to stanchion 40.

Similarly, lower locking pin 46 (shown on the left-hand side of FIG. 3) is connected by pivot pin 100 to lower link 102. Lower link 102 passes through intermediate apertured supporting plate 70c, and that at its upper end is pivotally linked at 104 to the other arm of crank 96.

Handle 48 of the locking mechanism being described is attached at its upper end 106 to pivotally mounted crank 96. With this arrangement of parts, when the user of this device lifts handle 48, this motion lowers upper link 92 and raises lower link 102, thus retracting upper locking pin 44 and lower locking pin 46, respectively, from the apertures in track means 30 at the top of the car and in the locking strip on the floor of the box car. With the locking pins in the retracted positions described, stanchion 40 can be rolled along track means 30 to any position desired by the user of this device. When stanchion 40 has been brought into its desired position along the length of the freight transporting vehicle, handle 48 may be lowered to insert locking pins 44 and 46 again in their respective apertures, to lock stanchion 40 in its new position.

Coil compression spring 110 bears against intermediate support plate 70b of stanchion 40 and against pin 112 in upper link 92 to urge upper locking pin 44, and at the same time (through the operation of crank 96) lower locking pin 46, into their respective engaged positions.

Freight Restraining Action Of The Stanchion

Depending upon the type of lading to be transported in the railroad box car or other freight transporting vehicle, any desired number of stanchions may be employed on either side of the vehicle. Ordinarily, when the freight restraining device of this invention is employed in a railroad box car, a total of four stanchions is used, two at each end of the car. With freight loaded in the box car at each end, two stanchions at one end of the car are rolled along their respective track means until they come into contact with the lading at that end of the car, and the same thing is done with the stanchions at the other end of the car.

As is seen from FIG. 1, each stanchion 40 extends transversely across the railroad box car only a short distance with respect to the total width of the car. This results, as already indicated above, in a great savings in the weight of this freight restraining device as compared to any bulkhead (whether of full construction or only open frame construction) that extends across the entire width of a box car.

The rear plate 61 of each stanchion 40, which faces in the direction of an end of the freight car operates as a vertically extending bracing surface disposed in a plane substantially normal to track means 30. With large cartons or other articles of a size that they extend substantially from one side wall 24 of car 20 to the other side wall, it is seen that these vertically extending bracing surfaces will engage and brace the corners of any such large articles and restrain them from undesired movement within the car, and no other engagement will be necessary to brace the freight effectively.

Roller Or Rollers Positioned Above Stanchion Center Of Gravity

Figure 4:
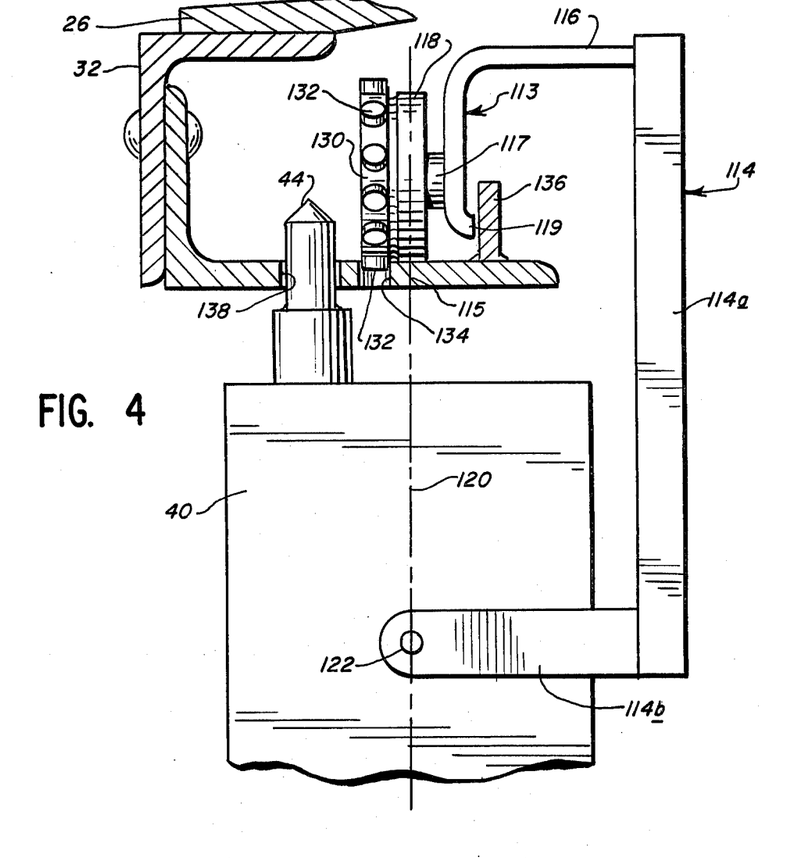
FIG. 4 is a front elevation of the top portion of a stanchion, its supporting carriage means, and interconnecting yoke means, with the track means with which the device is used shown in section.

FIG. 4 shows carriage means 113 and yoke member 114 for use with another embodiment of the freight restraining device of this invention. Top wall 26 of a railroad box car and conventional supporting structure 32 are again shown diagrammatically.

Track means 115, spaced inwardly of the side wall of the railroad box car and extending along at least a portion of the length of the cargo area near top wall 26, is shown attached to structure 32. Carriage means 113 rides upon track means 115 to various desired positions along the length of the track means.

Support angle 116 is secured to the top of vertical yoke arm 114a at one end, and at the other end supports horizontal axle 117 above track means 115 at right angles to the track. Axle 117 and its support structure 116 are seen to extend laterally beyond track means 115 on the side thereof adjacent the interior of the box car, to permit engagement with yoke member 114, which can be moved freely along track means 115 to permit selective positioning of stanchion 40.

A single roller 118 is visible in the drawing of FIG. 4. This may be the only roller employed but, as explained below, if desired a second roller may be employed that is hidden from view by the first mentioned roller. It is essential that, as shown, this first mentioned roller means 118, which is rotatably mounted on axle means 117 for rolling on track means 115, be disposed along the axle on both sides of vertical plane 120 that passes through center of gravity 121 (which can be seen in FIG. 3) of stanchion 40 and is parallel to the track means.

In the embodiment shown, horizontally disposed yoke arm 114b extends toward the nearest exterior wall of the railroad box car, and pivotally supports stanchion 40 at its free end. Member 114b is a U-shaped arm, and stanchion 40 is pivotally supported on either side of the stanchion at pivot points 122 located at the free end of each arm of the U-shaped arm. Pivot points 122 lie in the vertical plane 120 that is parallel to the track means 115 and passes through the center of gravity of the stanchion.

Figure 5:
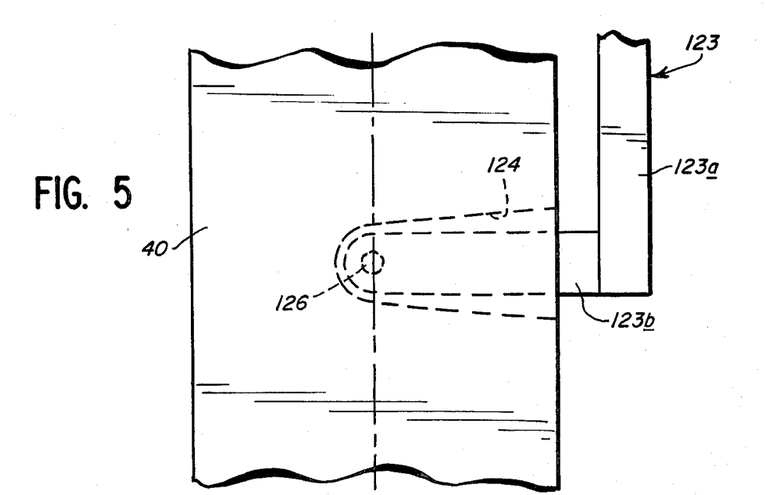
FIG. 5 is a fragmentary front elevation showing a portion of a stanchion and a portion of another yoke means supporting the same.

FIG. 5 shows a single horizontally extending arm 123b attached to the lower end of vertical arm 123a of yoke means 123. Horizontal arm 123b extends into hollow space 124 in stanchion 40, terminating at pivot 126 by which it supports the stanchion. Pivot 126 is located in the vertical plane that is parallel to track means 115 and passes through the center of gravity of stanchion 40.

With the construction shown in FIGS. 4 and 5, the connection between yoke member 114 or 123, respectively, and stanchion 40 is articulated in one direction only, i.e., in a plane normal to track means 115. With the type of connection shown, the connection between the yoke member and the stanchion is substantially rigid in a vertical plane perpendicular to the first plane mentioned, or in other words parallel to track means 115.

As explained above, this construction may include only a single roller means 118. However, it is preferable to have a plurality of rollers disposed longitudinally, or in tandem, along track means 115. (In FIG. 4 the rear roller is hidden from view by front roller 118.) In such case, care should be taken not to allow stanchion 40 to swing too far out of the vertical position in a direction parallel to track means 115, in order to avoid undue stress being placed upon carriage means 113, its attachment to yoke member 114, the attachment of horizontal arm 114b to the yoke member, or pivot point 122.

This problem can be avoided if a single roller means 118 is included in carriage 113. In any such embodiment, however, a guide or slide means should be provided to prevent any twisting of the stanchion in the horizontal plane. Free end portion 119 of support angle 116 may, for example, provide a guide means extending longitudinally of track means 115, in a position to slide along vertical safety lip 136 as the carriage means rolls along its track.

Roller means 118 is integrally formed with roller extension 130, which carries a plurality of sprockets 132 equally spaced around its circumference. A plurality of equally spaced holes 134 extends along track means 115 in positions to receive sprockets 132 as roller 118 rolls along the track. As will be seen, the cooperation of sprockets 132 with sprocket-receiving holes 134 prevents sliding movement of roller means 118 along track means 115. It also prevents any substantial movement of roller means 118 transverse to the track means, at least so long as the engagement of the sprockets in their associated holes is maintained. Vertical safety lip 136 extends upward from the track means to provide a barrier to keep support angle 116, and roller 118 carried by it, from becoming disengaged altogether from track means 115 so that stanchion 40 could fall from its upright position.

Upper locking pins 44 are shown in their locked position in FIG. 4, inserted in keeper holes 138 in the supporting member for track means 115. In this embodiment, the row of keeper holes is spaced laterally from track means 115.

With the embodiment shown in FIG. 4, yoke means 114 is connected at the upper end with axle means 117 and its supporting structure 116, and at the lower end with stanchion 40, in such a manner as to provide a support framework for stanchion 40 that has a particular characteristic mentioned above that is essential to the present invention. This characteristic is the fact that the support framework provided for stanchion 40 is rigid throughout its entire extent, in the vertical plane that passes through center of gravity 121 of stanchion 40 (FIG. 3) and is normal to track means 115, from roller means 118 along axle means 117, supporting structure 116, yoke member 114, and across the stanchion to the vertical plane that passes through the center of gravity of the stanchion and is parallel to the track means. FIG. 5 is a fragmentary front elevation showing a portion of stanchion 40 and a portion of yoke means 123 supporting the stanchion, which fragmentary view provides another embodiment of the freight restraining device of this invention when substituted for the lower portion of FIG. 4, which has already been described. In this embodiment, the support framework provided for stanchion 40 is rigid throughout its entire extent, in the vertical plane that passes through center of gravity 121 of stanchion 40 (FIG. 3) and is normal to track means 115 (in other words, the plane of the drawing sheet), from roller means 118 along axle means 117, supporting structure 116 (all as seen in FIG. 4), yoke member 123, and through horizontal member 123b across the stanchion to the vertical plane 120 that passes through the center of gravity of the stanchion and is parallel to the track means.

With this characteristic, together with the fact that roller means 118 is disposed along axle means 117 on both sides of the vertical plane 120, which is parallel to track means 115 and passes through center of gravity 121 of stanchion 40, the stanchion hangs truly vertically when its lower end is unrestrained. By this means the serious defect of known freight restraining devices of the stanchion type—the cocking or swinging of the stanchion far out of the desired vertical attitude, which is described above—is entirely avoided.

Figure 6:
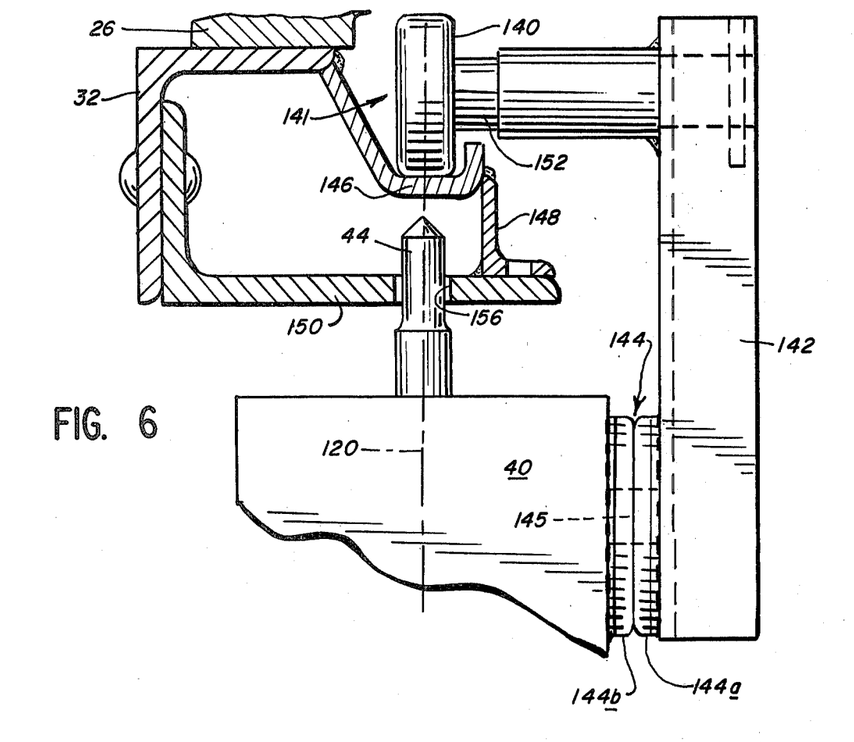
FIG. 6 is a view, similar to FIG. 4, of another embodiment of the device of this invention.

FIG. 6 illustrates another embodiment of this invention that includes two rollers 140 mounted in tandem in carriage means 141. In this Figure only one of the rollers is seen, the second being hidden from view behind the one of the pair of rollers that is visible.

As will be seen, railroad box car top wall 26 is again shown diagrammatically, and conventional structure 32 is likewise shown. Track means 146 is carried by member 32, with roller means 140 positioned to ride along the track with portions of the roller disposed on both sides of vertical plane 120 that passes through the center of gravity of stanchion 40 and is parallel to the track means. This embodiment may be constructed by welding track means 146 to member 32 and to longitudinally extending flange member 148 of an existing track 150 of a freight car on which freight restraining bulkheads of the type extending across the full width of the car have previously been used.

Upper locking pins 44 in their locked position protrude into keeper holes 156 in the previously existing track means in the railroad box car. In this embodiment, keeper holes 156 are positioned directly beneath track means 146 upon which roller means 140 rides.

Axle means 152 is rigidly attached to the upper end of yoke member 142. At the lower end of the yoke member, first plate 144a is pivotally connected at pivot 145 to second plate 144b of turntable 144. By this means, a connection between the yoke member and stanchion 40 is provided that permits articulation in a plane parallel to track means 146, but is rigid in a plane normal to the track means.

In this embodiment, again, a support framework is provided for stanchion 40 that is rigid throughout its entire extent, in the vertical plane that passes through the center of gravity of the stanchion and is normal to the track means, from roller means 140, along axle 152 and yoke member 142, and across the stanchion to the vertical plane that passes through the center of gravity of the stanchion and is parallel to the track means.

Rollers Disposed On Either Side Of Stanchion Center of Gravity

Figure 7:
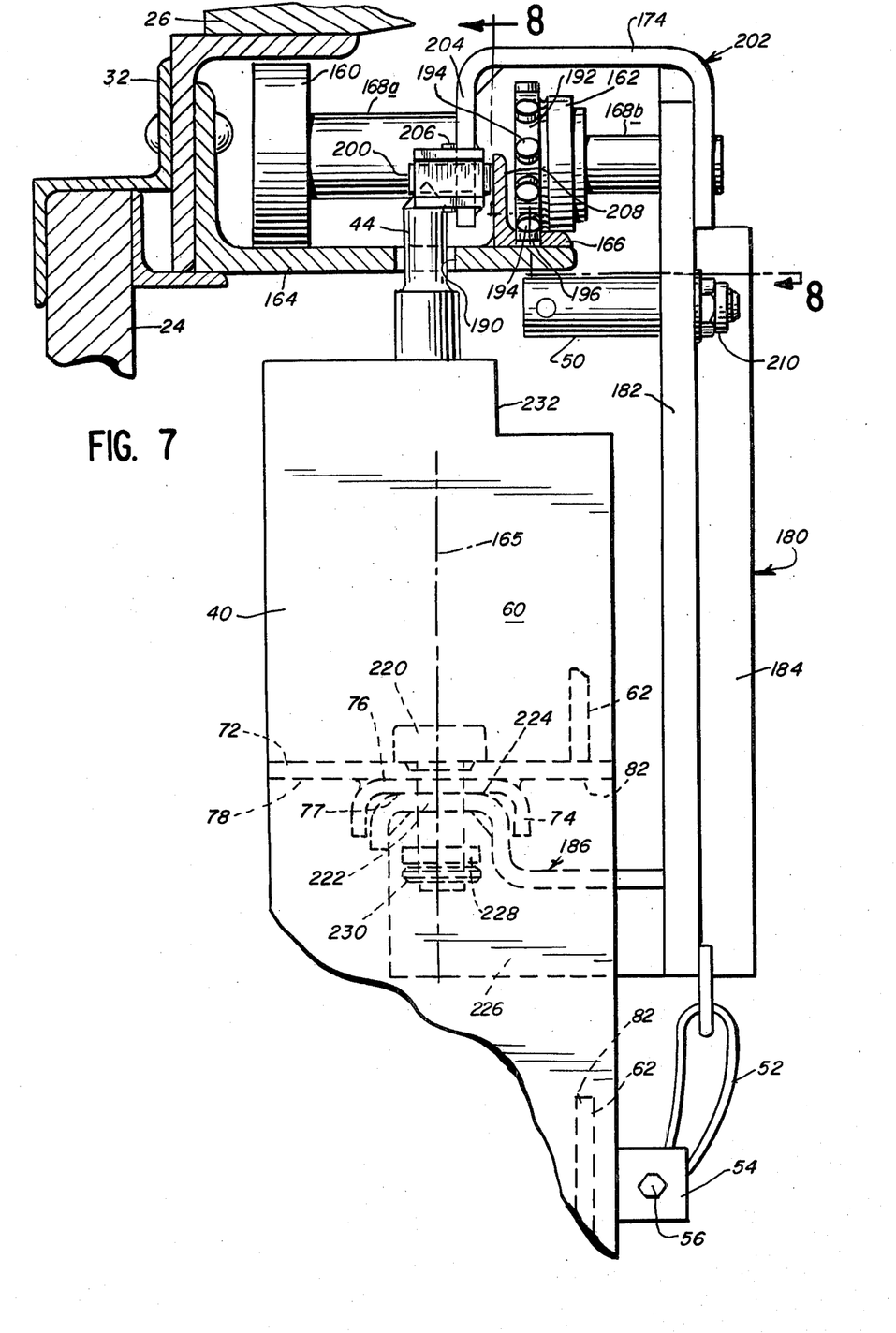
FIG. 7 is a view, similar to FIG. 4, showing still another embodiment of the device of this invention.
Figure 8:
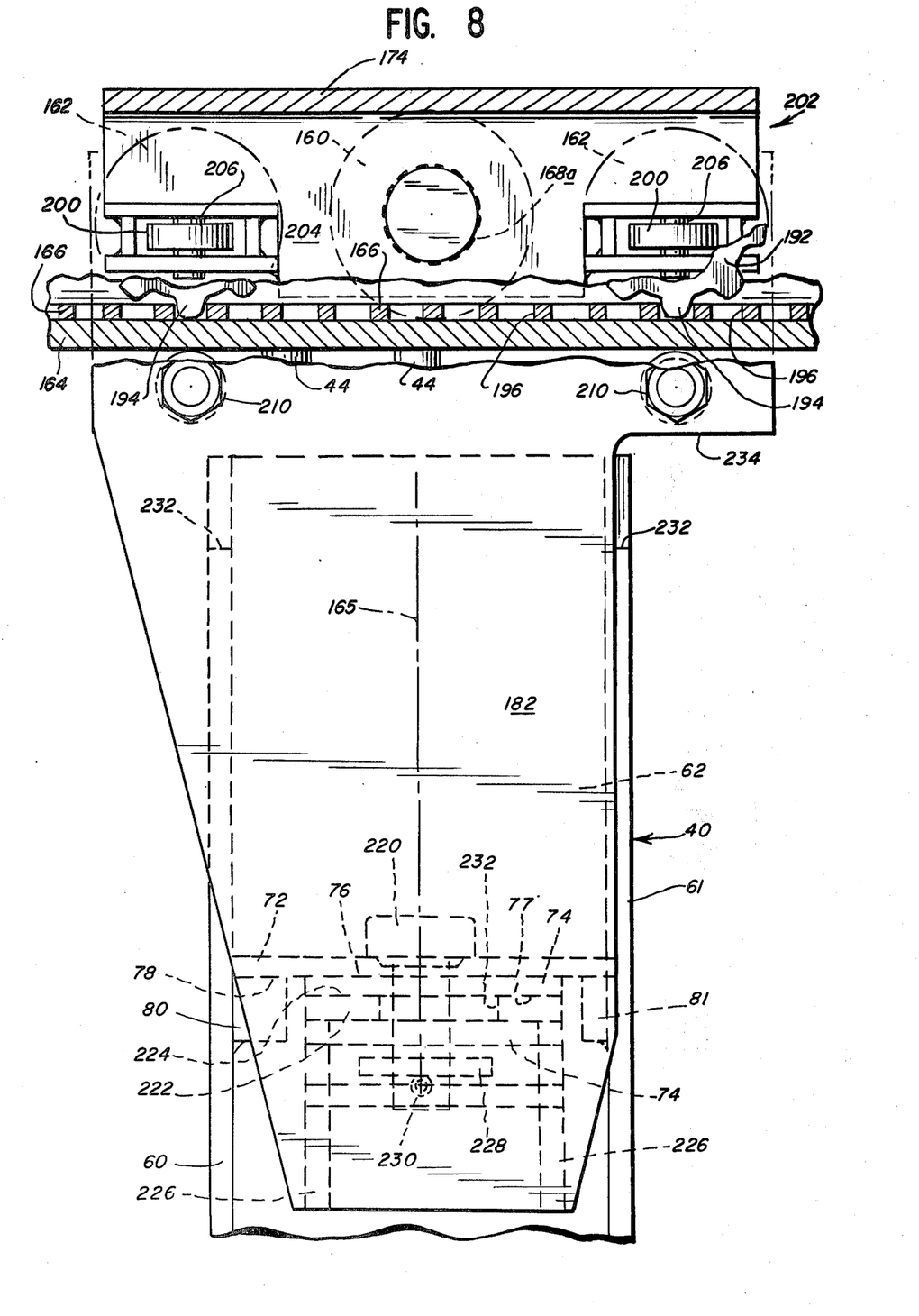
FIG. 8 is a side elevation view, partly broken away, partly in section, with one part omitted for clarity, showing the carriage means supported upon the track, the yoke means, and the upper portion of the stanchion of the device of this invention.

FIGS. 7 and 8 illustrate an embodiment of the freight restraining device of this invention in which a plurality of roller means 160 and 162 is utilized, with one roller means disposed on each side of vertical plane 165 that passes through the center of gravity of stanchion 40 and is parallel, as shown, to the track means. This embodiment is generally similar to the device shown on a smaller scale in FIG. 1.

In this embodiment, railroad box car top wall 26 is again shown diagrammatically, and conventional structure 32 is shown at the top of the box car. Side wall 24 of the box car is likewise shown diagrammatically.

The carriage means of this embodiment is illustrated in the top half of these Figures. Track means 164 and 166 extend along the side of the cargo area, parallel to the longitudinal axis of the box car. Roller 160 rides on track means 164, and a pair of rollers 162 (only one of which is visible in FIG. 7) rides on track means 166. The rollers are mounted on fixed axle means 168a (for roller 160) and 168b (for rollers 162), respectively.

Axle means 168a and its supporting structure 174 and axle means 168b extend laterally beyond track means 164 and 166 on the side of the track means facing the interior of the freight transporting vehicle, and are connected at that end with yoke member 180. The yoke member is comprised of vertical plate 182, gusset 184, and horizontally extending arm 186.

As will be seen from FIG. 7, upper locking pins 44 of stanchion 40 when in their locked positions protrude into keeper holes 190 which are spaced laterally from track means 164 on which roller 160 rides, and also spaced laterally from means 166 on which rollers 162 ride.

Extension 192, integrally formed with roller 162, carries equally spaced sprockets 194. As roller 162 rotates, sprockets 194 enter sprocket-receiving holes 196, which are longitudinally spaced at equal intervals adjacent outer track means 166. The cooperation between sprockets 194 and sprocket-receiving holes 196 operates to prevent sliding movement of rollers 162 along the track means, and to prevent any substantial movement of roller means 162 transverse to the track means.

As will be seen, inverted flange member 204 is carried by vertical plate 182, with which it is connected through support member 174. The inverted flange is positioned between upright safety lip 208, which extends alongside track means 166, and the exterior of the freight transporting vehicle. Inverted flange 204 carries two horizontal rollers 200, each of which rotates about its associated vertical axis 206.

Horizontal rollers 200 provide additional insurance against displacement of rollers 160 and 162 off track means 164 and 166 toward the interior of the railroad box car, since they are positioned to abut vertical safety lip means 208 if sprockets 194 are displaced from sprocket-receiving holes 196 and move toward the interior of the vehicle. Thus, if carriage 202 of this embodiment tends to slide to the right in FIG. 7 off the track means, rollers 200 will ride against upright a vertical safety lip means 208 to oppose any further lateral movement of the carriage.

The top half of FIG. 8 shows a side elevation view of carriage means 202 of this embodiment, with much of the structure broken away for clarity. Roller 160 and rollers 162 are shown in phantom, with fragments of extensions 192 on rollers 162, as well as the accompanying sprockets 164, also shown. Horizontal rollers 200, rotatably mounted on their respective vertical axles 206, are shown behind rollers 162. Track means 166, which defines sprocket-receiving holes 196, is shown in section.

Carriage hold-down device 50 is secured to yoke member 182 by nut 210. The free end of this hold-down device extends beneath track means 164, so that it will oppose any upward displacement of carriage 202 if sprockets 194 tend to move out of sprocket-receiving holes 196. This provides a further safety feature that helps keep stanchion 40 in place on the track means whenever locking pins 44 are in their retracted positions and the stanchion is being moved along the track means.

Figure 9:
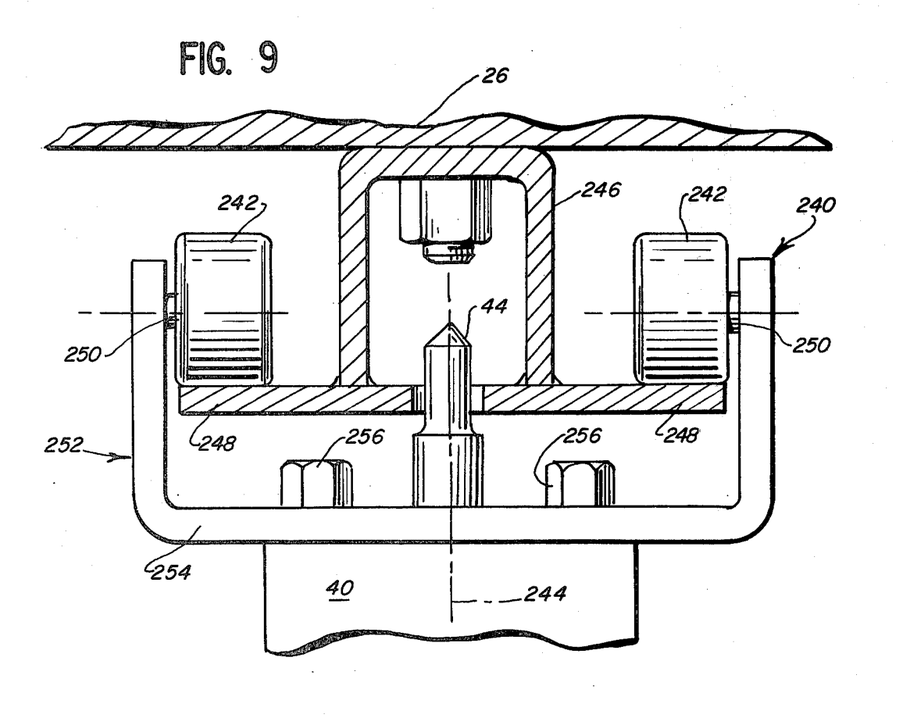
FIG. 9 is a view, similar to FIG. 4, showing another embodiment of the device of this invention.

FIG. 9 (on the same sheet as FIG. 6) illustrates another embodiment of the freight restraining device of this invention in which carriage means 240 includes a pair of laterally spaced rollers 242 positioned at substantially equal distances on each side of vertical plane 244 that passes through the center of gravity of stanchion 40 and is parallel to the track means.

Top wall 26 of the railroad box car is shown diagrammatically in the Figure. Inverted U-shaped channel member 246 is secured to top wall 26. Track means 248 is carried by the downwardly extending arms of the inverted channel, with portions of the track means extending on both sides of channel 246. As shown, rollers 242 rotate about axles 250 to ride upon track means 248.

Yoke means 252, which is a U-shaped member, supports stanchion 40 upon carriage means 240. Bight 254 of yoke member 252 is shown in this embodiment as rigidly connected to stanchion 40 by a bolt and nut arrangement 256. If desired, the connecting means between yoke member 252 and stanchion 40 may be a connection allowing for a limited amount of sway such as, for example, the means shown in the lower portions of FIGS. 7 and 8 and discussed below.

Suspension Of Stanchion From Yoke Member

The lower portions of FIGS. 7 and 8 illustrate means for connecting stanchion 40 and yoke member 182. In FIG. 7, filler members 80 and 81 located beneath horizontal plate member 72 are omitted for clarity, and in FIG. 8 several elements in the interior of stanchion 40 that are shown in FIG. 3, as well as gusset 184 shown in FIG. 7, are also omitted for clarity.

As explained above in connection with FIG. 3, horizontal flat plate member 72 is secured to the interior of stanchion 40 as a part of the means of supporting the stanchion on its associated yoke, designated in FIGS. 7 and 8 as element 182. As best seen in FIG. 7, channel member 74, which has a planar exterior surface 76 and a planar interior surface 77 on its bottom wall, is secured (as by welding) in an inverted position to bottom surface 78 of horizontal plate member 72.

Flat plate member 72 secured to stanchion 40 and inverted channel member 74 both have central apertures to receive loosely fitting retaining pin 220. Horizontal arm 186 extends from vertical arm 182 of the yoke member toward the exterior wall of the freight transporting vehicle, through opening 82 in side wall 62 of the stanchion, to a position beneath track means 164 and 166. Horizontal shelf member 222, which has an upper, planar bearing surface 224, is located at the free end of horizontal arm 186 of the yoke member. Shelf member 222 is supported by vertical load-bearing plates 226, which (as best seen in FIG. 8) are disposed on either side of retaining pin 220. Load-bearing plates 226 are secured at their other ends to vertical arm 182 of yoke member 180.

Shelf member 222 is centrally apertured with a hole that is aligned with the center holes of channel member 74 and horizontal plate member 72. Vertical line 165, which passes through the center of gravity of stanchion 40 when it is supported by yoke member 180, passes through the approximate center of planar bearing surface 224 of shelf member 222.

Retaining pin 220 carries washer 228 and roll pins 230 at its lower end, with a considerable play between the washer and shelf member 222, thereby providing a loose but secure connection between yoke member 180 and stanchion 40. Roll pins 230 are designed to be held securely in the apertured bottom end of retaining pin 220, but at the same time to be removable from time to time when required by the servicing and maintenance of the freight retaining device of this invention. Because of the loose fit between retaining pin 220 and horizontal plate member 72, inverted channel member 74, and shelf member 222, the horizontal plate member is free to rock to a limited extent upon the shelf member in response to lateral or longitudinal displacement forces applied to stanchion 40 at the middle or lower portions of the stanchion.

In the embodiment shown, shelf member 222 as seen in plan has a rectangular shape, with one pair of opposite sides (seen in FIG. 8) being longer than the other pair of opposite sides (seen in FIG. 7). Shelf member 222 in plan may, if desired, be of circular or other appropriate shape.

Inverted channel member 74 functions to limit the shifting transverse to track means 164 and 166 that can take place between plate 72 and shelf member 222. Filler members 80 and 81 limit the shifting that can take place between plate 72 and shelf member 222 in the longitudinal direction with respect to track means 164 and 166. Within these limits imposed by members 74, 80 and 81, the connection between yoke member 180 and stanchion 40 is articulated in all directions, or in other words in all vertical planes.

In this embodiment, aperture 232 in shelf member 222 has a larger dimension in the direction parallel to the longitudinal axis of track means 164 than it has in the direction transverse to the track means (FIG. 8). Thus retaining pin 220 can move more freely in that longitudinal direction, and as a result the amount of shift of stanchion 40 on shelf member 222 permitted in the direction along the track means is greater than the amount of shift permitted in the transverse direction.

If desired, inverted channel member 74 may be replaced by an inverted cup-shaped member of appropriate dimensions.

When necessary for servicing or maintenance, stanchion 40 can be removed from its suspension on carriage means 202 by first rolling the carriage means into position opposite the open side door of the freight car, then removing roll pins 230 and washer 228, removing retaining pin 220, making sure that locking pins 44 and 46 are retracted from their respective locking apertures, detaching safety device 52, and thereafter lifting flat plate member 72 and its attached inverted channel member 74 up vertically off shelf member 222. Carriage hold-down device 50 does not block this vertical movement of stanchion 40 because of the presence of notch 232 in the top side portion of the stanchion that faces the interior of the freight car. With the stanchion in this elevated position, it can be removed through the open side door of the freight car.

In a second method of removing stanchion 40 for servicing or maintenance, the stanchion can be removed from the track means together with its associated carriage means, without dismantling the connection between the yoke means and the stanchion. In this method the end stops are removed from the track means, and the carriage means is rolled off the track with the stanchion still secured to it.

Notch 234 in vertical arm 182 of yoke member 180 is provided on the side of the freight restraining device that faces a load, so that the portion of stanchion 40 that bears upon the freight under restraint in the cargo area will present (as seen on the right-hand side of FIG. 8) a vertically disposed planar surface.

As pointed out above, the freight restraining device of this invention avoids two serious problems of prior art freight bracing or restraining stanchions. The carriage means described in various embodiments shown in the Figures of the drawings avoids the undesirable cocking or swinging of the stanchion out of its usual vertical position that results automatically when the locking device at the bottom of prior art stanchions is not engaged. At the same time, the connecting means between the stanchion and the yoke member by which it is supported permits a limited amount of sway in response to horizontal forces applied to the stanchion, and thus avoids placing undue stress on the carriage means, yoke means or other elements of the device.

The suspension of stanchion 40 upon shelf member 222, whose upper bearing surface has substantial dimensions in all directions, provides an unexpected advantage over any suspension that is equivalent to a point suspension. While, as just indicated, a limited amount of stanchion sway is desirable to avoid undue stress on the parts from which stanchion 40 is suspended, the stanchion should not be too easily movable from the vertical position in order that, when necessary, the user can roll the stanchion along the track means instead of having it swing away from the vertical in response to the smallest horizontal force applied by the user.

The area and shape of the upper bearing surface of shelf member 222 should be selected so as to cause stanchion 40 to swing out of a vertical orientation only if a predetermined minimum moment of force is applied to the stanchion. It will follow from this that a horizontal force of a predetermined maximum magnitude can be applied—at the height at which a user customarily pushes against the stanchion to roll it along the track means—without moving the stanchion out of its vertical position.

It should be understood that references in this specification and claims to the center of gravity of the stanchion member of the device of this invention refer to the approximate location of the center of gravity. In those cases in which the connection between the yoke member and the stanchion is rigid in a plane normal to the track means (FIG. 6) or is rigid in all directions (FIG. 9), if the carriage means and yoke member are of relatively heavy construction the determination of the location of the center of gravity of the stanchion should for accuracy take into account the weight of the carriage and yoke.

The above detailed description has been given for ease of understanding only. No unnecessary limitations should be understood therefrom, as modifications will be obvious to those skilled in the art.

We claim:

1. A device for restraining freight in a cargo area in a freight transporting vehicle, which vehicle has track means spaced inwardly of a side wall of the vehicle and extending along one side of at least a portion of the length of the cargo area in the top portion thereof, which comprises:

horizontal axle means positioned above said track means at right angles thereto, said axle means and any supporting structure therefor extending laterally beyond said track means on at least one side thereof;

an upright, elongated stanchion having a vertically extending cargo restraining surface on one side thereof substantially normal to said track means, said cargo restraining surface extending transversely for substantially less than one-half of the width of said cargo area;

roller means rotatably mounted on said axle means for rolling on said track means, said roller means being disposed along said axle means on both sides of the vertical plane that passes through the center of gravity of said stanchion and is parallel to said track means;

yoke means connected with said axle means and any supporting structure therefor at its upper end and connected with said stanchion at its lower end, to provide a support framework for said stanchion that is rigid throughout its entire extent, in a first vertical plane that passes through the center of gravity of the stanchion and is normal to said track means, from said roller means, along said axle means and any supporting structure, along said yoke means, and across said stanchion to a second vertical plane that passes through said center of gravity and is parallel to said track means, the connection between said stanchion and said lower end of said yoke means, when said roller means includes more than one roller disposed in a given direction, being articulated in said given direction, said stanchion being supported solely by said track means extending along said one side of said freight transporting vehicle; and locking means for locking said stanchion in selected positions with respect to said cargo area.

2. The freight restraining device of claim 1 which includes:

a plurality of equally spaced sprockets carried by said roller means; and means defining a row of sprocket-receiving holes extending along said track means, whereby sliding movement of said roller means along said track means and any substantial movement of the roller means transverse to said track means are prevented.

3. The freight restraining device of claim 1 in which one end of said axle means is disposed over said track means, with the other end of said axle means and any supporting structure for said axle means extending laterally beyond said track means.

4. The freight restraining device of claim 3 in which the inner end of said axle means and any supporting structure for said axle means extends beyond said track means into the interior of said vehicle and said yoke means is supported thereby, said yoke means including at least a vertical arm.

5. The freight restraining device of claim 4 which includes a plurality of horizontal axles, each of which rotatably supports a single roller, said rollers being spaced longitudinally along said track means, each of said rollers extending laterally along its associated axle means on both sides of the vertical plane that passes through the center of gravity of said stanchion and is parallel to said track means.

6. The freight restraining device of claim 4 in which the connection between said yoke means and said stanchion is rigid in a plane normal to said track means and is pivotable in a vertical plane that passes through said connection and is parallel to said track means.

7. The freight restraining device of claim 1 which includes at least one horizontal axle with a single roller rotatably mounted thereon, said single roller extending laterally along said axle means on both sides of said vertical plane that passes through the center of gravity of said stanchion and is parallel to said track means.

8. The freight restraining device of claim 7 in which said yoke means includes a horizontally disposed arm extending toward the exterior wall of said vehicle, said stanchion being pivotally supported by said horizontal member at at least one point lying substantially in the vertical plane that passes through the center of gravity of said stanchion and is parallel to said track means.

9. The freight restraining device of claim 8 in which said horizontally disposed arm of said yoke means is U-shaped and said stanchion is pivotally supported by the arms of said U-shaped member substantially at points lying in the vertical plane that passes through the center of gravity of said stanchion and is parallel to said track means.

10. The freight restraining device of claim 8 in which said stanchion is pivotally supported by said horizontal arm substantially at a point on the vertical line that passes through the center of gravity of said stanchion.

11. The freight restraining device of claim 1 in which said roller means includes a pair of rollers that are spaced from each other in a direction transverse to said track means, one of said rollers being positioned on each side of the vertical plane that passes through the center of gravity of said stanchion and is parallel to said track means.

12. The freight restraining device of claim 11 in which each of said pair of transversely spaced rollers is positioned at a substantially equal distance from said vertical plane that passes through the center of gravity of said stanchion and is parallel to said track means.

13. The freight restraining device of claim 1 in which the connection between said yoke means and said stanchion is articulated in at least one direction.

14. The freight restraining device of claim 1 in which the connection between said yoke means and said stanchion is articulated in a plane normal to said track means.

15. The freight restraining device of claim 1 in which the connection between said yoke means and said stanchion is articulated in a plane parallel to said track means.

16. The freight restraining device of claim 1 in which the connection between said yoke means and said stanchion is articulated in a plane normal to said track means and in a plane parallel to said track means.

17. The freight restraining device of claim 16 in which (a) said yoke means is an L-shaped member having a vertical arm and a horizontal arm extending towards the outer wall of said vehicle beneath said track means, and (b) the connection between said yoke means and said stanchion is provided by a horizontal shelf member supported on the free end of said horizontal arm of the yoke means, said shelf member having an upper, planar bearing surface, the vertical line on which the center of gravity of said stanchion lies passing through said planar bearing surface, and a horizontal flat plate member secured to said stanchion means and positioned to be supported by said planar bearing surface of said shelf member, said plate member being free to rock upon said shelf member in response to lateral or longitudinal displacement forces applied to the lower portions of said stanchion.

18. The freight restraining device of claim 17 in which the vertical line on which the center of gravity of said stanchion lies passes through the approximate center of said planar bearing surface.

19. The freight restraining device of claim 17 in which said upper, planar bearing surface of said shelf member is rectangular in shape.

20. The freight restraining device of claim 19 in which one pair of opposite sides of said rectangular bearing surface is longer than the other pair of opposite sides.

21. The freight restraining device of claim 19 in which said bearing surface is of an area and shape to cause said stanchion supported by said bearing surface to swing out of a vertical orientation only if a predetermined minimum amount of force is applied to the stanchion.

22. The freight restraining device of claim 17 in which said shelf member and said horizontal, flat plate member secured to said stanchion means define aligned holes and a loosely fitting restraining pin member is positioned in said holes.

23. The freight restraining device of claim 17 in which a channel-shaped member having a planar bottom wall is secured in an inverted position to the bottom surface of said horizontal plate member that is secured to said stanchion, said channel-shaped member having a hole aligned with the center holes of said shelf member and said plate member, said loosely fitting retaining pin being received in all said holes.

24. The freight restraining device of claim 1 in which the connection between said yoke means and said stanchion is articulated in all vertical planes.

25. The freight restraining device of claim 1 in which said track means carries a vertical safety lip means extending along the side of said track means adjacent the interior of said vehicle, and said yoke means carries an inverted flange member positioned between said lip means and the exterior of the freight transporting vehicle when said roller means is in position upon said track means.

26. The freight restraining device of claim 25 in which said inverted flange carries a roller rotatable about a vertical axis, said roller being positioned to abut said safety lip if said carrier means is moved toward the interior of said vehicle.

27. The freight restraining device of claim 1 in which said track means defines a row of keeper holes, and a vertically movable pin carried by the upper portion of said stanchion is adapted to be moved up into a selected one of said row of holes and thereafter to be removed from said hole.

28. The freight restraining device of claim 1 which includes means, secured to the upper portion of said vehicle and disposed adjacent said track means, that defines a row of keeper holes, and a vertically movable pin carried by the upper portion of said stanchion and adapted to be selectively moved into and out of each of said holes.

29. The freight restraining device of claim 28 in which said means defining a row of keeper holes is spaced laterally from said track means.

30. The freight restraining device of claim 28 in which said means defining a row of keeper holes is positioned directly beneath said track means.

31. In a device for restraining freight in a cargo area in a freight transporting vehicle, which device includes an upright stanchion suspended by means of a yoke member from a carriage for rolling along track means spaced inwardly of a side wall of the vehicle and extending along at least a portion of the length of the cargo area in the top portion thereof, said stanchion having a horizontal flat plate member secured thereto, said yoke member being a generally L-shaped member having a vertical arm and a horizontal arm extending towards the outer wall of said vehicle beneath said track means, the subcombination of means for connecting said stanchion and said yoke member, which comprises:

a horizontal shelf member supported on the free end of said horizontal arm of the yoke member, said shelf member having an upper, planar bearing surface, the vertical line on which the center of gravity of said stanchion lies, when the stanchion is supported by said yoke member, passing through said planar bearing surface, said shelf member being positioned to support said flat plate member secured to said stanchion, with said flat plate member being free to rock upon said shelf member in response to lateral or longitudinal displacement forces applied to the lower portions of said stanchion.

32. The connecting means of claim 31 in which the vertical line on which the center of gravity of said stanchion lies, when the stanchion is supported by said yoke member, passes through the approximate center of said planar bearing surface of said shelf member.

33. The connecting means of claim 31 in which said plate member is free to rock upon said shelf member in response to horizontal displacement forces applied to said stanchion from any direction.

34. The connecting means of claim 31 in which said upper, planar bearing surface of the shelf member is rectangular in shape.

35. The connecting means of claim 34 in which one pair of opposite sides of said rectangular bearing surface is longer than the other pair of opposite sides.

36. The connecting means of claim 34 in which said bearing surface is of an area and shape to cause said stanchion supported by said bearing surface to swing out of a vertical orientation only if a predetermined minimum amount of force is applied to the stanchion.

37. The connecting means of claim 31 in which said shelf member and said plate member secured to the stanchion define aligned holes, and a loosely fitting retaining pin member is positioned in said holes.

38. The connecting means of claim 31 in which a channel-shaped member having a bottom wall with planar exterior and interior surfaces is attached in an inverted position to the bottom surface of said horizontal plate member secured to said stanchion, said channel-shaped member having a hole aligned with the center holes of said shelf member and of said plate member, said loosely fitting retaining pin being received in all said holes.

* * * * *